US012506691B2

United States Patent
Narkhede et al.

(10) Patent No.: US 12,506,691 B2
(45) Date of Patent: Dec. 23, 2025

(54) NORMALIZED CONCURRENCY LIMITS FOR THROTTLING AND FAULT ISOLATION IN A ROUTING SERVICE

(71) Applicant: Microsoft Technology Licensing, LLC, Redmond, WA (US)

(72) Inventors: Kushal Suresh Narkhede, Redmond, WA (US); Daniel Walzenbach, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 18/514,339

(22) Filed: Nov. 20, 2023

(65) Prior Publication Data
US 2025/0168117 A1     May 22, 2025

(51) Int. Cl.
*H04L 47/25*     (2022.01)
*H04L 47/12*     (2022.01)

(52) U.S. Cl.
CPC ............ *H04L 47/12* (2013.01); *H04L 47/25* (2013.01)

(58) Field of Classification Search
CPC ................. H04L 47/12; H04L 47/25
USPC ........................................ 709/232
See application file for complete search history.

(56) References Cited

U.S. PATENT DOCUMENTS

| | | | | |
|---|---|---|---|---|
| 9,354,813 | B1* | 5/2016 | Dolan | G06F 3/0647 |
| 9,537,787 | B2* | 1/2017 | Bachar | H04L 47/70 |
| 11,922,220 | B2* | 3/2024 | Haghighat | G06F 11/3409 |
| 11,973,839 | B1* | 4/2024 | Nagpal | H04L 47/20 |
| 2015/0039766 | A1* | 2/2015 | Bachar | H04L 67/10 709/226 |
| 2021/0028991 | A1* | 1/2021 | Nataraj | H04L 41/16 |
| 2021/0280287 | A1* | 9/2021 | Mahmood | G16H 10/60 |

FOREIGN PATENT DOCUMENTS

| | | | | |
|---|---|---|---|---|
| CN | 113904984 | * | 10/2021 | H04L 45/745 |
| CN | 115802372 A | * | 3/2023 | |
| WO | WO-2012174499 A2 | * | 12/2012 | H04L 67/63 |

* cited by examiner

*Primary Examiner* — Ario Etienne
*Assistant Examiner* — Kidest Mendaye
(74) *Attorney, Agent, or Firm* — Schwegman Lundberg & Woessner, P.A.

(57) ABSTRACT

The processing capabilities of the machines in a routing service are evaluated and traffic patterns indicative of how calls are made to different dependency services are identified. The capabilities of the routing service and the traffic patterns are used to generate a dynamic limit model that dynamically limits the number of calls made to each dependency service. When the capabilities of the routing service change, the dynamic limit model automatically adjusts the limit corresponding to each dependency service.

8 Claims, 8 Drawing Sheets

NORMALIZED CONCURRENCY LIMITS FOR THROTTLING AND FAULT ISOLATION IN A ROUTING SERVICE

BACKGROUND

Computing systems are currently in wide use. Some such computing systems are hosted systems that host functionality on a backend server. Users or systems provide requests, through a frontend service, to the backend server. The user data is often stored on, and manipulated on, the backend server.

When a user or system submits a request, that request is processed by a routing service. The routing service identifies the destination of the backend server that is to service the request and routes the request to that destination. In order to identify the destination, the routing service often uses one or more different dependency services that process the request to identify the location of its destination (e.g., the backend service to which the request is directed).

Under normal circumstances, the routing service will queue the calls to the dependency services so that the calls can be processed, in turn.

The discussion above is merely provided for general background information and is not intended to be used as an aid in determining the scope of the claimed subject matter.

SUMMARY

The processing capabilities of the machines in a routing service are evaluated and traffic patterns indicative of how calls are made to different dependency services are identified. The capabilities of the routing service and the traffic patterns are used to generate a dynamic limit model that dynamically limits the number of calls made to each dependency service. When the capabilities of the routing service change, the dynamic limit model automatically adjusts the limit corresponding to each dependency service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, some routing services use a dependency guard to set a static limit on the number of calls that can be pending for a given dependency destination service, where the dependency destination service is used to identify the destination (or target server) of the call received by the routing service. The destination may correspond to a target backend server that holds the data corresponding to the received request. For any given architecture, there may be hundreds of thousands of backend servers and the routing service may need to reliably route millions of requests per day to target backend servers that are accurately identified.

In order to process a request to identify its destination (or target server), the routing service accesses any of a plurality of different dependency destination services (or dependency services) that process the request to identify the destination or target server for the request. Some of the services may be relatively short latency services while others are longer latency services.

If the number of calls pending for a particular dependency service exceeds a certain limit, this can make the entire routing service unhealthy in that the process of routing requests to their destinations may become undesirably slow, or may fail. Therefore, the routing service also provides a guard framework which sets a limit on the number of pending calls allowed for the different dependency services. The routing service thus blocks further calls to a dependency service once the number of pending calls exceeds the identified limit. In some current systems, a static limit is set which limits the number of calls that can be pending for any of the dependency destination services. When that static limit is exceeded, further calls to the corresponding dependency service are blocked.

However, the capabilities of the routing service may change over time. For instance, the hardware machines deployed to implement the routing service or dependency services may be used more efficiently or may be replaced by faster or more computationally capable machines. In such cases, the static limit may be out of date or set too low. Similarly, the efficiency of a particular dependency destination service may change as well. For instance, if the efficiency of a dependency destination service increases, then, again, the static limit on the pending calls to that dependency service may be artificially low. Thus, as the capabilities of the routing service and the efficiencies of the dependency services change, the static limit may be inaccurate or undesirable. However, due to the sheer size of the request processing system and the dependency services in terms of the number of servers, updating the static limit quickly and accurately can be very difficult.

Further, the routing service is often distributed among a plurality of different pools of machines that are geographically disbursed from one another. The traffic patterns (in terms of the number of calls or proportion of calls to each of the dependency destination services) may vary by geographic location. Again, attempting to update the static limit corresponding to each dependency service, based upon varying traffic patterns, can be extremely time consuming and error prone.

The present description thus describes a system that generates a dynamic limit model, for each dependency destination service, that dynamically sets the limit corresponding to the number of calls that are allowed to be pending for each dependency destination service. The present system considers the capabilities of the machines on the routing service and dependency services as well as the traffic patterns in order to generate the dynamic limit model. Thus, the dynamic limit model(s) can be deployed to dynamically adjust the limit during runtime. This increases the accuracy and efficiency of the operation for the routing service and dynamically isolates unhealthy dependency services, which increases the robustness of the routing service.

Figure 1:
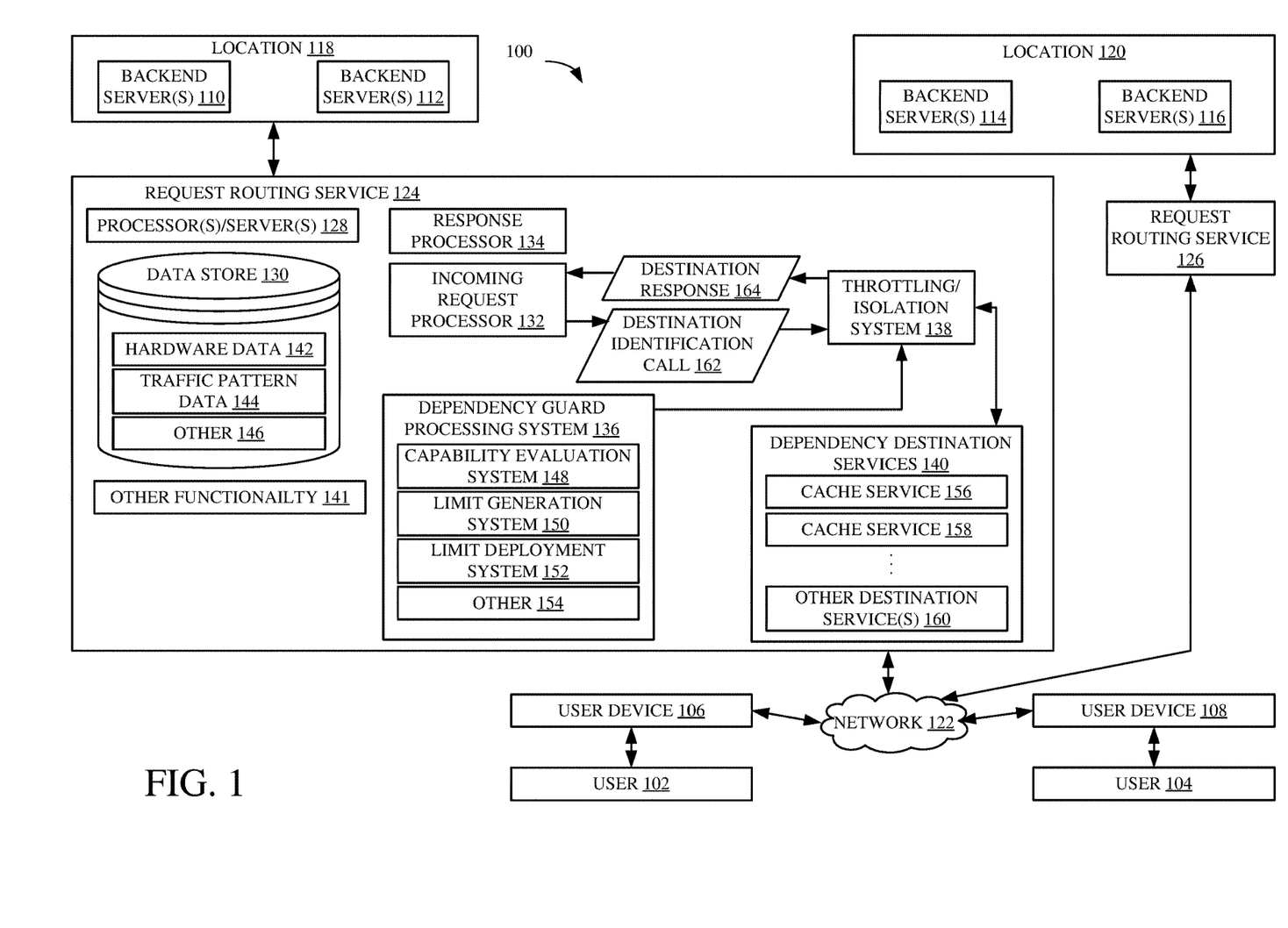
FIG. 1 is a block diagram of one example of a computing system architecture.

FIG. 1 is a block diagram of one example of computing system architecture 100 in which users 102-104 use user devices 106-108, respectively, in order to access data and functionality at backend servers 110, 112, 114, and 116. The backend servers may be clustered or grouped or otherwise located at different locations 118-120. The user data for users 102-104 may be stored in any location. In order to access and manipulate their data at different backend servers, users 102-104 often generate requests at user devices 106-108. The requests are transmitted over a network 122 to a request routing service 124-126. The request routing service 124-126 identifies the proper destination (e.g., the target backend server) of the request, based on user data, tenant data, etc., and routes that request to the proper backend server 110-116. The backend server then processes the request and may return a response which is then returned to the appropriate user device over network 122 for interaction or viewing by the user that initiated the request.

In one example, the request routing services 124-126 can run on machines that are distributed globally among a wide variety of different locations. Thus, in the example shown in FIG. 1, the request routing service is identified by services 124 and 126 which may be located remotely from one another. The request routing services 124-126 can run separate services or a single service that is run on distributed machines. These and other architectures are contemplated herein.

In the example shown in FIG. 1, request routing services 124 and 126 may be similar so that only request routing service 124 is described in more detail. Request routing service 124 can include one or more processors or servers (which may be implemented on one or more machines) 128, data store 130, incoming request processor 132, response processor 134, dependency guard processing system 136, throttling/isolation system 138, a set of dependency destination services 140, and other request processing functionality 141. Data store 130 can include hardware data 142 and traffic pattern data 144 and other data 146. The hardware data 142 may identify the particular hardware machines (such as by SKU, etc.) that are used to implement request routing service 124 and/or dependency destination services 140. Hardware data 142 may provide an indication of the capabilities of the hardware, such as the speed, memory usage, algorithms, and other indicators of the capabilities of the machines. The capabilities may indicate the number of requests per second that the request routing service 124 and/or the dependency destination services 140 can process under maximum load. Traffic pattern data 144 may include metrics or other indicators indicative of the traffic patterns at the location of request routing service 124. For instance, traffic pattern data 144 may indicate how often each of the particular dependency destination services 140 are used to identify the destination of incoming requests (or the number of calls to each dependency destination service 140 or the proportion of calls to each dependency destination server 140, etc.). This is described in greater detail elsewhere herein.

Dependency guard processing system 136 can include capability evaluation system 148, limit generation system 150, limit deployment system 152, and other items 154. The dependency destination services 140 shown in FIG. 1 include a first cache service 156, a second cache service 158, and any of a wide variety of other destination services 160. Before describing the overall operation of architecture 100 in more detail, a description of some of the items in architecture 100, and their operation, will first be provided. User devices 106-108 can be mobile devices, desktop computers, laptop computers, tenant servers, or any of a wide variety of other devices. Network 122 can be a wide area network, a local area network, a near field communication network, a cellular network, a Wi-Fi or Bluetooth network, or any of a wide variety of other networks or combinations or networks. Each of the backend servers 110-116 can store and manipulate user data and may run the functionality of hosted applications, hosted data stores, or any of a wide variety of other hosted services or components or backend systems.

Incoming request processor 132 receives requests from user devices 106-108. For purposes of the present discussion, it will be assumed that user 102 actuates user device 106 in order to generate a request to control and manipulate a portion of backend server 110 which functions to control and manipulate user data. Thus, incoming request processor 132 receives the request from user device 106 over network 122 and processes that request to identify its destination or target backend server (e.g., the particular backend server, at a particular location, that should receive the request). Thus, as part of that processing, incoming request processor 132 generates a destination identification call 162 which is sent to throttling/isolation system 138. Call 162 identifies the particular dependency destination service 140 that is to be used to identify the destination for the received request.

By way of example, dependency destination services 140 process the information in destination identification call 162 to determine the destination of the request received by incoming request processor 132. Cache service 156 may be a service that uses a cache and attempts to match information in the call 162 against cached locations that identify the destination (or target backend server) that was previously determined for such a call. Cache service 158 may be a more detailed service that is longer latency and requires further processing. Other destination services 160 may be still more complicated, longer latency operations that require more computing system resources (e.g., more CPU and memory usage, etc.).

The call 162 identifies the particular dependency destination service 140 that is to process the request and return a destination response 164 identifying the destination that the incoming request should be routed to. Throttling/isolation system 138 determines whether the identified dependency destination service 140 that is to process the call has too many pending calls. If so, then the call 162 is throttled or rejected. If not, however, then the call 162 is enqueued for processing by the identified dependency destination service 140. Dependency destination service 140 then processes the call 162 to identify the destination of the request received by incoming request processor 132 and provides the destination response 164 that identifies that destination. The destination, for instance, will identify a particular target backend server 110-116 that is to receive the request. Incoming request processor 132 sends the request to the target background server which may provide a response. Response processor 134 receives the response from the target server and can send the response to the user device that made the request.

Dependency guard processing system 136 dynamically generates limits on the number of pending calls to each of the dependency destination services 140. In one example, system 136 generates a dynamic model corresponding to each dependency destination service 140 that automatically adjusts the limit of pending calls to corresponding service 140 under certain circumstances. The dynamic models are output to throttle/isolation system 138.

If throttle/isolation system 138 determines that the number of calls pending for a particular dependency destination service 140 exceeds the limit, then this indicates that that particular dependency destination service is on the verge of becoming unhealthy. It may have crashed or is operating in an undesirably slow manner. By rejecting further calls to that dependency destination service, throttling/isolation system 138 is isolating the unhealthy (or nearly unhealthy) dependency destination service 140 from the remaining dependency destination services 140, which may be healthy. Therefore, any subsequent calls to those remaining dependency destination services 140 will still be processed so that request routing service 124 can continue to operate at a high level, despite the fact that one of the dependency destination services 140 may be unhealthy.

As discussed above, some current systems set a static limit on the number of pending calls allowed for each of the dependency destination services 140. However, conditions on the request routing service 124 may change. For instance, the capabilities of the machines that are used to run request routing service 124 (and/or dependency destination services 140) may be upgraded so that the number of requests per second that can be serviced by the components of request routing service 124 (and/or dependency destination services 140) may increase as well. If the capabilities of the request routing service 124 increase, but the static limit for the dependency destination services 140 remains the same, then it may be that the request routing service 124 is not operating as efficiently as it could. For instance, throttle/isolation system 138 may be rejecting calls to the dependency destination services 140 because they exceed the static limit of pending calls, yet because the capabilities of the dependency destination services 140 have increased, this means that those services 140 can handle more than the static limit of pending calls that was previously set and still remain healthy. Therefore, throttling/isolation system 138 is rejecting calls based on an inaccurately or artificially low static limit. The opposite is true as well. If the capabilities of the machine are reduced, the static limit may be set too high, which may result in the systems being overwhelmed.

Therefore, the present discussion proceeds with respect to dependency guard processing system 136 which generates a dynamic limit model for each of the dependency destination services 140. Each of the dynamic limit models dynamically adjusts the limit on the number of pending calls allowed for the corresponding dependency destination service 140 as the capabilities of the machines used to implement request routing service 124 and/or dependency destination services 140 change. It will be noted that the capabilities of the machine may change by upgrading the machine itself or revising the algorithms used by those machines so that they are more efficient. These are just examples and the capabilities of the machines may change for other reasons as well.

In operation, capability evaluation system 148 tracks or aggregates metrics indicative of the capabilities of the machines and algorithms used to implement request routing service 124 and dependency destination services 140. The capabilities may be stored as hardware data 142 in data store 130 or elsewhere. The traffic pattern data 144 is data that indicates the percent or proportion of calls 162 that are directed to each of the individual dependency destination services 140. For instance, if incoming request processor 132 receives one hundred requests per second and, in response, generates twenty destination calls 162 to cache service 156, thirty calls 162 to cache service 158, and fifty calls to a different destination service 160, then this information is stored as traffic pattern data 144 and indicates the proportion or the number of calls 162 that are directed to each of the dependency destination services 156, 158 and 160. The traffic pattern data 144 and hardware data 142 can be intermittently updated based on timing criteria or based on other criteria.

Based upon the capabilities, and based upon the traffic pattern data 144, limit generation system 150 generates a dynamic limit model for each dependency service 156, 158, 160 in the dependency destination services 140. Limit deployment system 152 outputs the dynamic limit model for each dependency destination service 140 to throttling/isolation system 138. Then, as characteristics of request routing service 124 change (e.g., as the capabilities of the machines or the efficiency of the algorithms change, etc.) the dynamic limit model for each of the dependency destination services 140 will generate a new limit on the number of calls that can be pending for the corresponding dependency destination service 140. This helps to ensure that request routing service 124 is not only isolating and throttling traffic to dependency destination services 140 that are unhealthy, but also that request routing service 124 is operating in a highly efficient manner, to take advantage of the increases in efficiency generated by increasing the capabilities of the machines used to implement request routing service 124 and dependency destination services 140.

Figure 2:
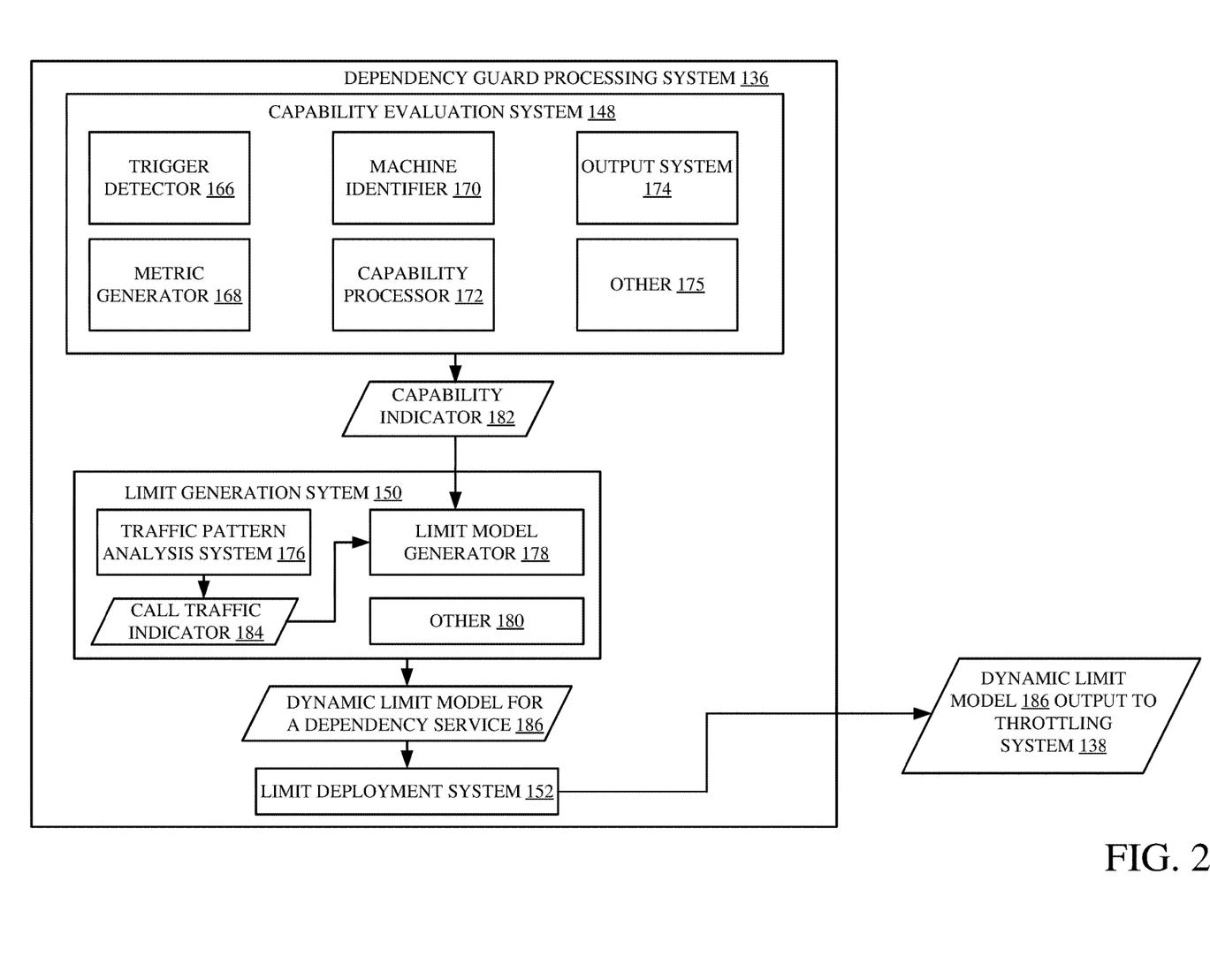
FIG. 2 is a block diagram showing one example of a dependency guard processing system, in more detail.

FIG. 2 is a block diagram showing one example of dependency guard processing system 136 in more detail. In the example shown in FIG. 2, capability evaluation system 148 includes trigger detector 166, metric generator 168, machine identifier 170, capability processor 172, output system 174 and other items 175. Limit generation system 150 includes traffic pattern analysis system 176, limit model generator 178, and other items 180. As discussed elsewhere herein, capability evaluation system 148 can intermittently re-evaluate the capabilities of the machines used in services 124, 140. Trigger detector 166 detects the trigger criteria for performing such an evaluation. In one example, trigger detector 166 detects time-based criteria so that, every thirty days, for instance, the capabilities of the machines and algorithms are evaluated. In another example, trigger detector 166 may use performance-based trigger criteria, such as when the performance of request routing service 124 increases or decreases suddenly. Other trigger criteria can be used as well.

Metric generator 168 aggregates data to generate metric values which are indicative of the capabilities of the machines and algorithms. The metrics can include latency data, CPU and memory usage data, and any of a wide variety of other data. The aggregated data (which may be aggregated since the last evaluation, or in other ways) is used to generate metric values which may be indicative of the capabilities of the machines and algorithms. Machine identifier 170 identifies the particular machines being evaluated (such as by SKU number, etc.) and capability processor 172 then generates a capability indicator indicative of the capabilities of the particular machine (e.g., as identified by SKU) based upon the metrics generated by metric generator 168. The capability indicator is output by system 174. In one example, the capability indicator is indicative of the maximum number of requests per second that can be processed by request routing service 124, The capability indicator 182 is output to limit generation system 150. Traffic pattern analysis system 176 accesses the traffic pattern data 144 to identify traffic patterns. The traffic patterns indicate the proportion or percentage of calls 162 that are directed to each of the different dependency destination services 156, 158, 160. Traffic pattern analysis system 176 generates a call traffic indicator 184 that indicates the traffic patterns identified by traffic pattern analysis system 176.

Limit model generator 178 receives the capability indicator 182 and the call traffic indicator 174 and generates a dynamic limit model 186, separately, for each of the different dependency destination services 156, 158, and 160. The dynamic limit model 186 for each dependency service is a model that automatically updates the limit on the pending calls for the corresponding dependency destination service 156, 158, 160 based upon changes to the machine capabilities and/or changes to the traffic patterns. Therefore, in one example, the dynamic limit model 186 is a ratio. Limit deployment system 152 outputs the dynamic limit models 186 to the throttling/isolation system 138, so that a model 186 can be used in throttling and/or isolating each of the different dependency destination services 156, 158, 160, independently of one another.

An example may be helpful. Assume, for instance, the maximum number of steady state requests per second on a particular machine SKU used to implement request routing service 124 and/or different dependency destination services 140 is 5,000 (e.g., 5,000 requests per second). Assign a value of M to the maximum steady state requests. Then, assume, based on an analysis of traffic pattern data 144, the number of requests per second that are sent to a particular different dependency destination service 140 (for purposes of the present example it is assumed that the number of requests per second are sent to cache service 156) is 500 (e.g., 500 requests per second—of the 5,000 possible requests per second—are sent to cache service 156). Assign the requests per second sent to cache service 156 as the value N. Assume that a scale limit value equals M and a scale multiplier value equals N/M. Then, given the number above, the scale limit value M=5000, and the scale multiplier N/M=500/5000=0.1. Then, at runtime, throttling/isolation system 138 multiplies the scale limit (M=5000) by the scale multiplier (N/M=0.1) to identify the number of calls that can be pending for cache service 156 as 5000*0.1=500. Thus, throttling/isolation system 138 allows only 500 pending calls 162 to cache service 156 per second. Thus, throttling/isolation system 138 inhibits overloading cache service 156 when more calls, above the limit, are made.

Now, assume that the efficiency of the machines deployed on request routing service 124 increases so that 8,000 requests per second can be processed, at steady state. This can be detected by capability evaluation system 148 and the new scale limit value M is now set to 8,000. Assuming a uniform scale up in the traffic patterns, then the new limit set for cache service 156 is 800 (8,000×0.1). Thus, the dynamic limit model 186 for cache service 156 automatically adjusts the limit for cache service 156 to 800 pending requests per second. The dynamic limit model 186 for each of the different dependency destination services 140 will automatically adjust the limits for each corresponding different dependency destination service by simply adjusting the scale limit setting of M, as the capabilities of the system increase.

Figure 3A:
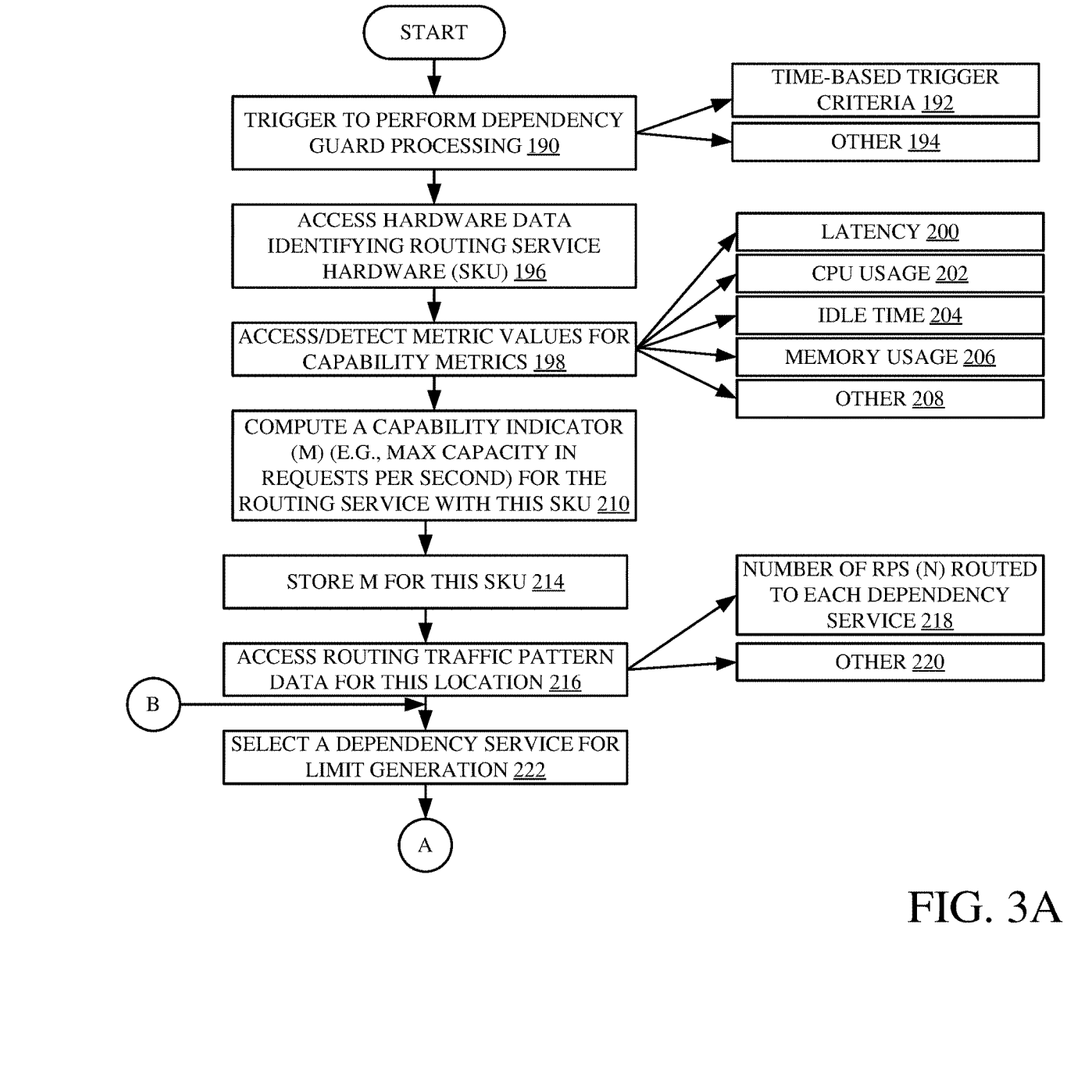
FIGS. 3A and 3B (collectively referred to herein as FIG. 3) show a flow diagram illustrating one example of the operation of the computing system architecture and dependency guard processing system.
Figure 3B:
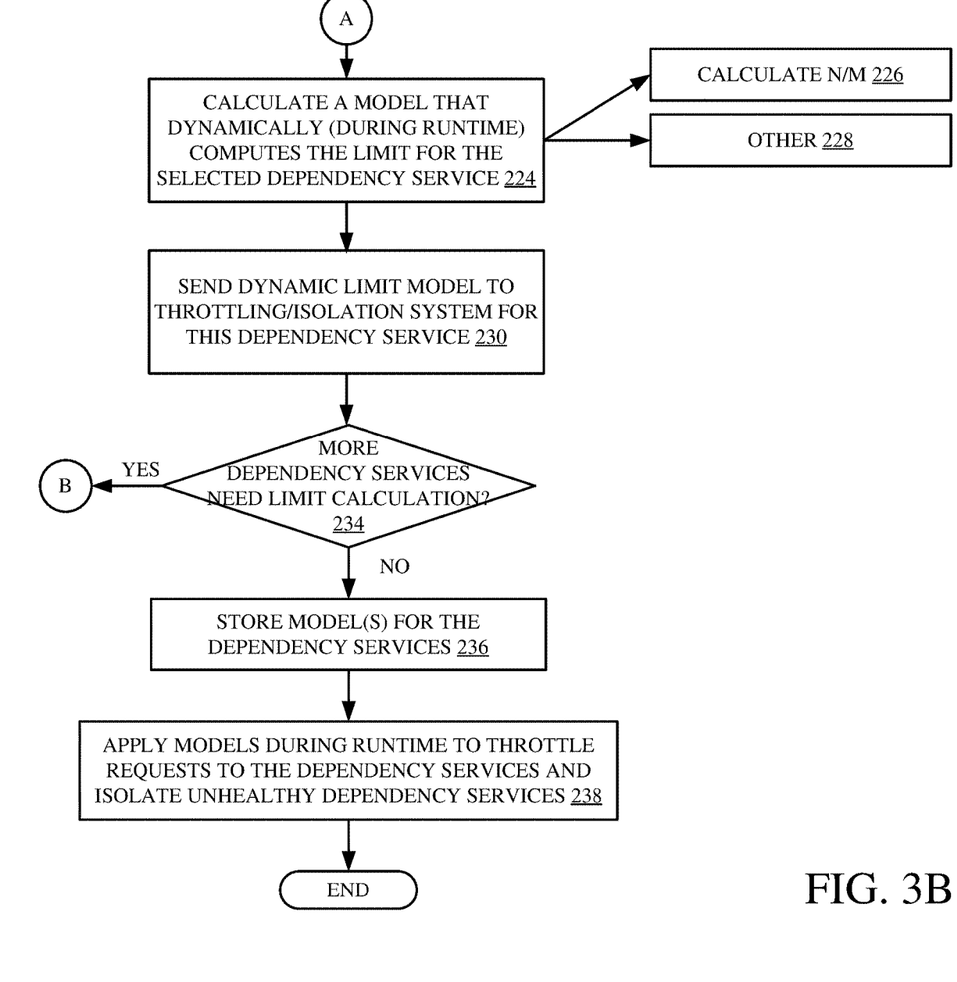

FIGS. 3A and 3B show a flow diagram illustrating one example of the operation of computing system architecture 100 and specifically request routing service 124 in generating and applying dynamic limit models 186 to throttle calls to the dependency destination services 140 in order to avoid overloading those services, and also to isolate unhealthy dependency destination services 140 so that the remaining dependency destination services 140 can continue to operate as desired. It is first assumed that trigger detector 166 detects a trigger to perform dependency guard processing, as indicated by block 190 in the flow diagram of FIG. 3. Trigger detector 166 can detect time-based trigger criteria 192 or any of a wide variety of other trigger criteria 194.

Machine identifier 170 accesses hardware data 142 to identify the routing service hardware (such as by SKU). Identifying the hardware or machines is indicated by block 196 in the flow diagram of FIG. 3.

Metric generator 168 accesses or detects the metric values that may be used to identify the capabilities of the machines. Accessing and/or detecting metric values for capability metrics is indicated by block 198 in the flow diagram of FIG. 3. The metric values may be values for latency 200, CPU usage 202, idle time 204, memory usage 206, and any of a wide variety of other capability metrics 208.

Capability processor 172 then calculates or computes a capability (M) indicator which indicates the capabilities of the machine with the identified SKU. In one example, the capability indicator M represents the maximum request capacity per second that can be serviced by request routing service 124 and/or different dependency destination services 140. Computing the capability indicator is illustrated by block 210 in the flow diagram of FIG. 3. The capability indicator M (182 in FIG. 2) can be stored as hardware data 142, as indicated by block 212 in the flow diagram of FIG. 3 or output to limit generation system 150 or provided in other ways.

Traffic pattern analysis system 176 then accesses the routing traffic pattern data 144 for the particular location of request routing service 124 for which dependency limits are being generated. Accessing the traffic pattern data 144 is indicated by block 216 in the flow diagram of FIG. 3.

The traffic pattern data can be detected by processor 132 or elsewhere. Traffic pattern analysis system 176 can also include a feedback system that identifies which dependency service the calls are being directed to so that the traffic pattern data 144 can be aggregated and stored and the traffic patterns can then be intermittently updated. In one example, the traffic pattern data is processed by traffic pattern analysis system 176 to generate the number of requests per second (N) that are routed to each of the different dependency destination services 156, 158, 160, as indicated by block 218 in the flow diagram of FIG. 3. The traffic pattern data can be processed in other ways as well, as indicated by block 220.

Limit model generator 178 then selects one of the dependency services 156-160 for which a dynamic limit model is to be generated, as indicated by block 222 in the flow diagram of FIG. 3. Limit model generator 178 then calculates or computes the model that dynamically (e.g., during runtime) computes the limit for the selected dependency service 156-160. Calculating the dynamic limit model 186 for the dependency service is indicated by block 224 in the flow diagram of FIG. 3. In one example, the model represents a ratio of N/M as indicated by block 226. However, the model could be another dynamic model that can be used to adjust the limits on pending calls for each of the dependency destination services 156-160. By automatic it is meant, in one example, that the function or process is performed without further human involvement except, perhaps, to initiate or authorize the function or process. Calculating a different model or calculating the model in other ways is indicated by block 228 in the flow diagram of FIG. 3.

Limit deployment system 152 then outputs the dynamic limit model 186 to throttling/isolation system 138 for this particular dependency service 156-160. Sending the dynamic limit model to throttling/isolation system 130 is indicated by block 230 in the flow diagram of FIG. 3.

Limit model generator 178 then determines whether there are more dependency destination services 156-160 for which a dynamic limit model 186 is to be computed, as indicated by block 234 in the flow diagram of FIG. 3. If so, processing reverts to block 222 where the next dependency service is selected. If not, however, processing continues at block 236 where the models for the different dependency services that have been calculated can be stored. Throttling/isolation system 138 then applies the dynamic limit models during runtime to throttle requests to the dependency services and to isolate unhealthy dependency services, as indicated by block 238 in the flow diagram of FIG. 3.

Figure 4:
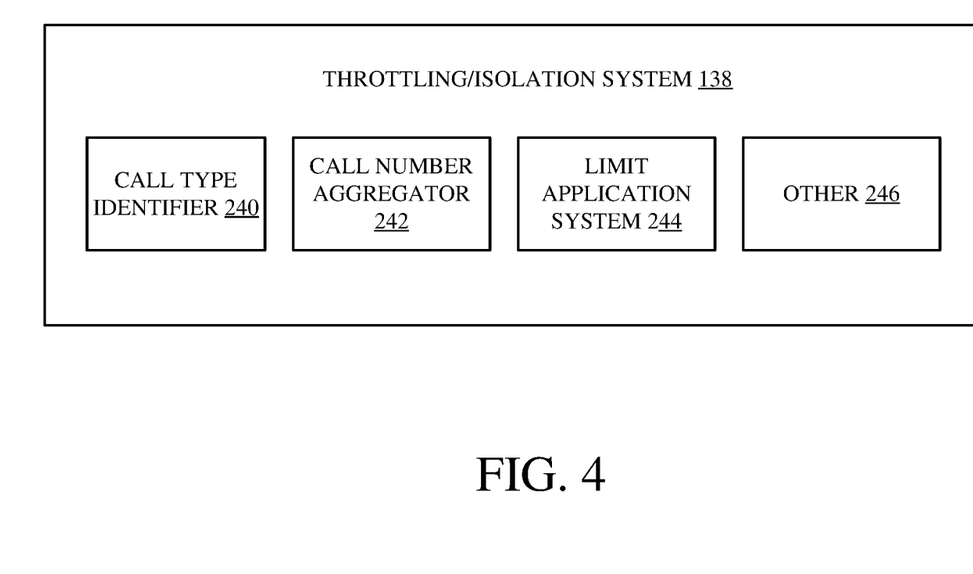
FIG. 4 is a block diagram showing one example of a throttling and isolation system in more detail.

FIG. 4 is a block diagram showing one example of throttling/isolation system 138 in more detail. In the example shown in FIG. 4, system 138 includes call type identifier 240, request number aggregator 242, limit application system 244, and other items 246. Call type identifier 240 identifies which particular dependency destination service 156-160 the destination call 162 is being directed to. Request number aggregator 242 aggregates the number of requests over time that are directed to each of the different dependency destination services 156-160. The counts of the number of calls that are aggregated for each service 156-160 can be stored as traffic pattern data 144 so that such data can be analyzed by traffic pattern analysis system 176 in limit generation system 150 (shown in FIG. 2). Limit application system 244 receives the dynamic limit model 186 for each of the dependency destination services 156-160. Once the type of call is identified by call type identifier 240 (so that system 138 knows which dependency destination service the call is being directed to), limit application system 244 applies the limit that is dynamically set by the dynamic limit model 186 to determine whether the call 162 should be throttled. If so, the call 162 is throttled. If not, however, then limit application system 244 enqueues the call 162 for the dependency destination service 140 that is being called.

Figure 5:
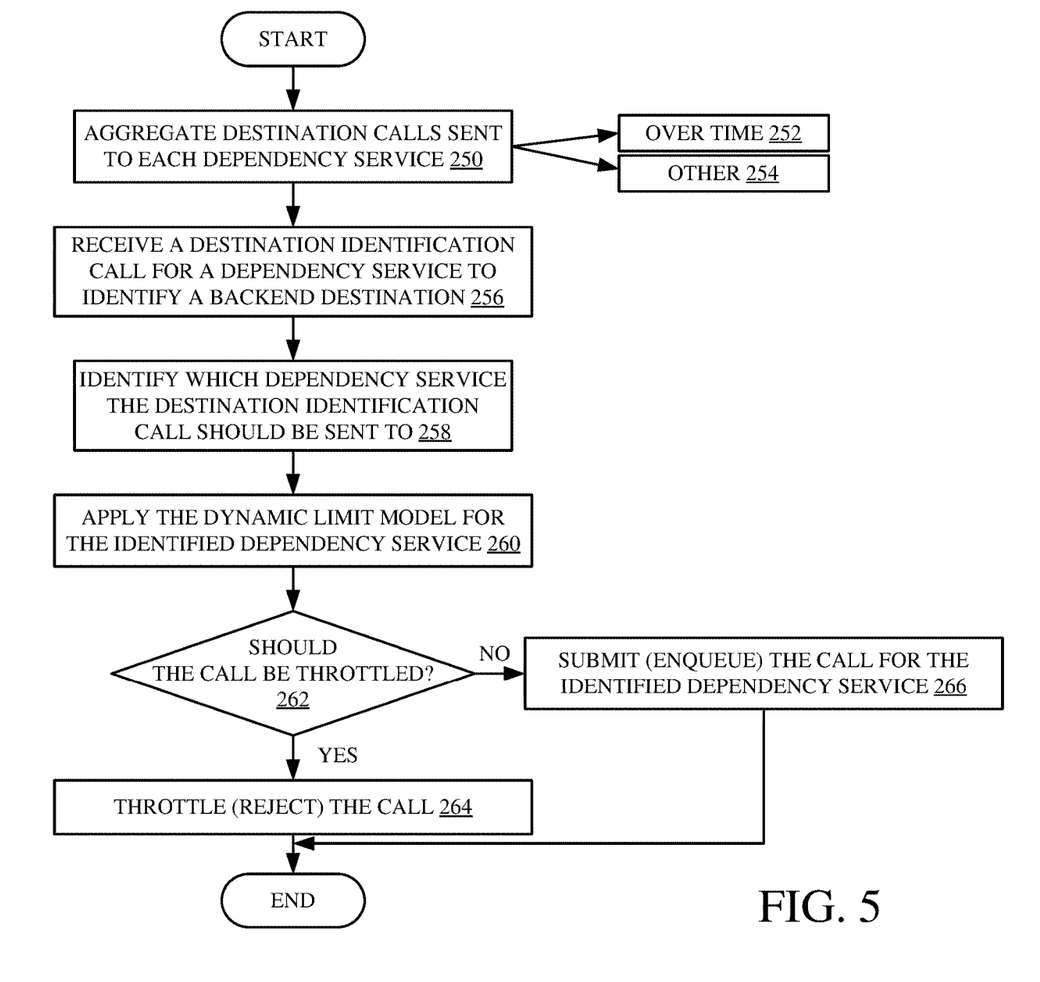
FIG. 5 is a flow diagram illustrating one example of the operation of the throttling and isolation system.

FIG. 5 is a flow diagram illustrating one example of the operation of throttling/isolation system 138 in more detail. It is first assumed that call number aggregator 242 has aggregated the calls 162 sent to each of the dependency services 156-160, as indicated by block 250 in the flow diagram of FIG. 5. The calls can be aggregated for each dependency service over time as indicated by block 252 or in other ways, as indicated by block 254. In one example, the proportion of the calls directed to each dependency service 156-160 can be computed and continuously updated as the number of calls are aggregated for each dependency service 156-160.

Call type identifier 240 then receives a destination identification call 162 for a dependency service 156-160 in order to identify a backend destination for a request received at incoming request processor 132 (shown in FIG. 1) corresponding to the destination identification call 162. Receiving the destination identification call 162 is indicated by block 256 in the flow diagram of FIG. 5. Call type identifier 240 then identifies which particular dependency service 156-160 the destination identification call 162 should be directed to. Identifying the dependency service is indicated by block 258 in the flow diagram of FIG. 5. Limit application system 244 then applies the dynamic limit model for the identified dependency service to determine whether the call 162 should be throttled. Applying the dynamic limit model for the identified dependency service is indicated by block 260 in the flow diagram of FIG. 5. Determining whether the call should be throttled is indicated by block 262 in the flow diagram of FIG. 5.

For instance, limit application system 244 can compare the number of pending calls for the identified dependency service to the dynamic limit that has been calculated for that dependency service. If the number of pending calls exceeds the limit, then this indicates that the newly-received call 162 should the throttled and the dependency service isolated. If not, then the call can be enqueued for the identified dependency service. Throttling (e.g., rejecting) the call is indicated by block 264 in the flow diagram of FIG. 5. Submitting or enqueuing the call at the identified dependency service is indicated by block 266 in the flow diagram of FIG. 5.

It can thus be seen that the present description describes a system that can dynamically set a limit on the number of concurrently pending calls to a particular dependency service. Dynamically updating the limits avoids the limits becoming stale over time and then causing availability issues. The present description also describes a system that dynamically calculates the limit model which is tuned based upon the particular hardware SKU capabilities. The dynamic limits generated by the dynamic limit model are normalized limits which allows a consistent scale to be generated for the concurrency limits for each SKU. Also, as the capabilities of each SKU are modified, the model dynamically adjusts the limits automatically. Further, because the routing service is a globally available, distributed service and thus runs on machines distributed globally, the present description describes a system that tunes the dependency limits based on traffic patterns at different geographic locations. Thus, the dynamic limits are automatically adjusted based on different traffic patterns at different geographic patterns. Further, by adjusting the scale limit value, all limits can be dynamically computed, automatically, which enhances the efficiency of the routing service without, or with much reduced, manual intervention over prior systems in which static limits where manually set. The capabilities of the machines can be intermittently evaluated, and a feedback system can also observe trends in traffic patterns and update the dynamic limit model accordingly.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. The processor(s) and server(s) are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
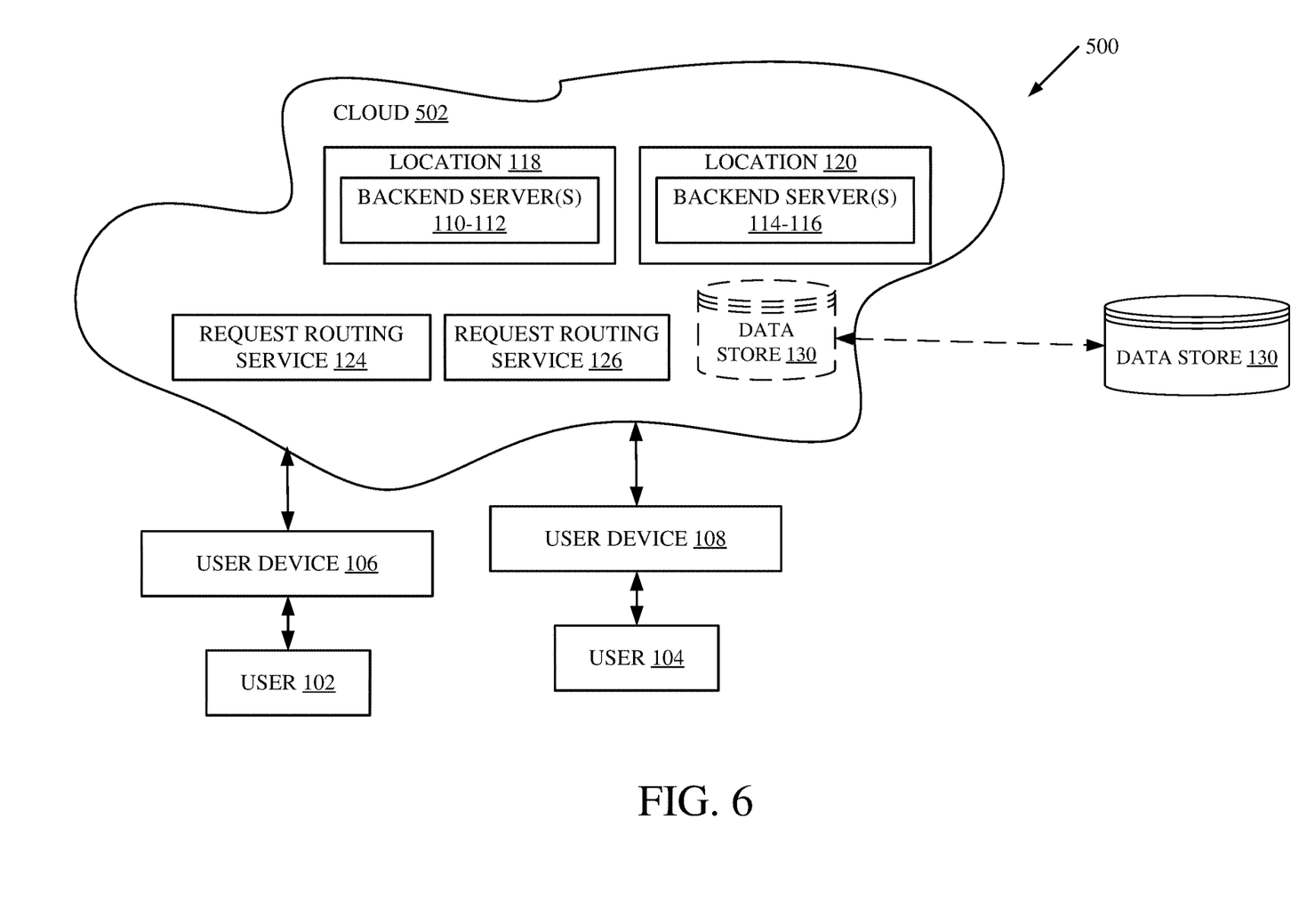
FIG. 6 is a block diagram showing one example of the computing system architecture illustrated in FIG. 1, deployed in a remote server architecture (such as a cloud architecture).

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that locations 118-120 can be different locations in cloud 502. Request routing services 124-126 can also be in cloud 502 (which can be public, private, or a combination where portions are public while others are private). Therefore, users 102-104 uses a user devices 106-108 to access those systems through cloud 502.

FIG. 6 also depicts another example of a cloud architecture. FIG. 6 shows that it is also contemplated that some elements of architecture 100 can be disposed in cloud 502 while others are not. By way of example, data store 130 can be disposed outside of cloud 502, and accessed through cloud 502. Regardless of where the items are located, the items can be accessed directly by devices 106-108, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
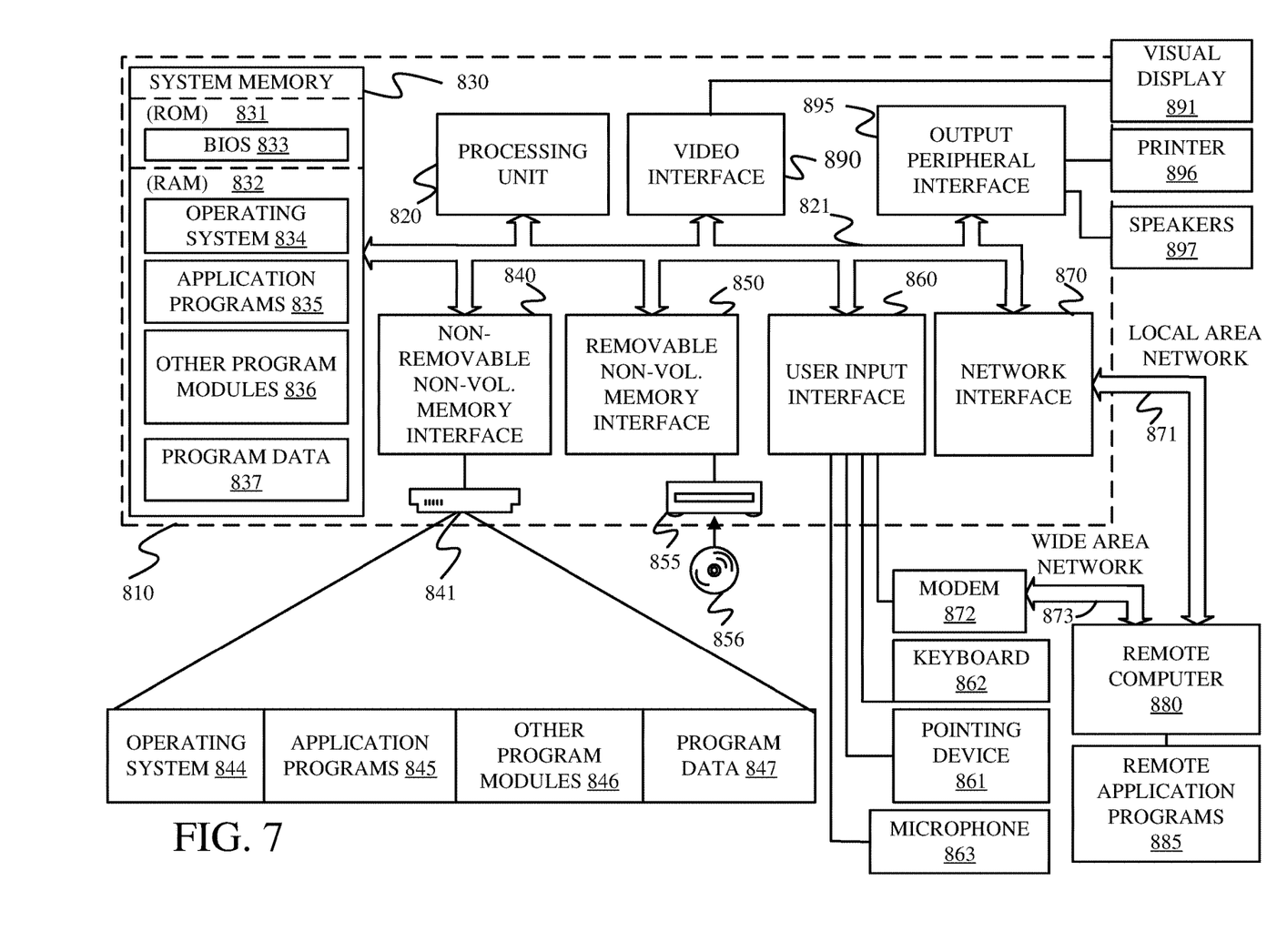
FIG. 7 is a block diagram showing one example of a computing environment that can be used in the architectures and systems described in the previous figures.

FIG. 7 is one example of a computing environment in which architecture 100, or parts of it, (for example) can be deployed. With reference to FIG. 7, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
accessing capability data indicative of request routing volume capabilities of a request routing service that routes requests to backend servers, the request routing service, when routing a request, calling a dependency service, of a plurality of different dependency services, to identify a destination of a target backend service corresponding to the request;
accessing traffic pattern data indicative of a level of usage of each of the plurality of dependency services;
generating a separate dynamic limit model corresponding to each of the plurality of dependency services, each of the separate dynamic limit models being configured to generate a dynamic concurrency limit indicative of a number of pending calls that are permitted for the corresponding dependency service; and sending the dynamic limit models to a throttling system that controls throttling of calls to each of the plurality of dependency services.

2. The computer implemented method of claim 1 wherein accessing capability data comprises:

identifying a number of requests (M) per unit time that can be processed by a portion of the request routing service based on machine identifying data and based on the request routing volume capabilities.

3. The computer implemented method of claim 2 wherein accessing traffic pattern data comprises:

identifying a number of calls (N) to each of the dependency services, per unit time.

4. The computer implemented method of claim 3 wherein generating a separate dynamic limit model for each of the plurality of dependency services comprises:

selecting a dependency service of the plurality of dependency services; and generating, as a dynamic limit model for the selected dependency service, a model based on a ratio of N/M.

5. The computer implemented method of claim 4 and further comprising:

applying the dynamic limit model for the selected dependency service to obtain a dynamic limit for the dependency service.

6. The computer implemented method of claim 5 wherein applying the dynamic limit model for the selected dependency service comprises:

calculating a dynamic limit for the selected dependency service based on the M and the ratio.

7. The computer implemented method of claim 5 and further comprising:

detecting a change in the number of requests M that can be processed to obtain an updated value of M; and applying the dynamic limit model to the updated value of M for the selected dependency service to obtain an updated dynamic limit for the selected dependency service.

8. The computer implemented method of claim 7 and further comprising:

applying the dynamic limit model corresponding to each dependency service to the updated value of M to obtain an updated dynamic limit for each corresponding dependency service.

\* \* \* \* \*